April 20, 1965 J. B. BARTHOLOMEW 3,179,069
DOUGH DIVIDERS
Filed Dec. 20, 1961
2 Sheets-Sheet 1

INVENTOR:
JOHN BARRETT BARTHOLOMEW
BY
ATTORNEYS

April 20, 1965    J. B. BARTHOLOMEW    3,179,069
DOUGH DIVIDERS
Filed Dec. 20, 1961    2 Sheets-Sheet 2
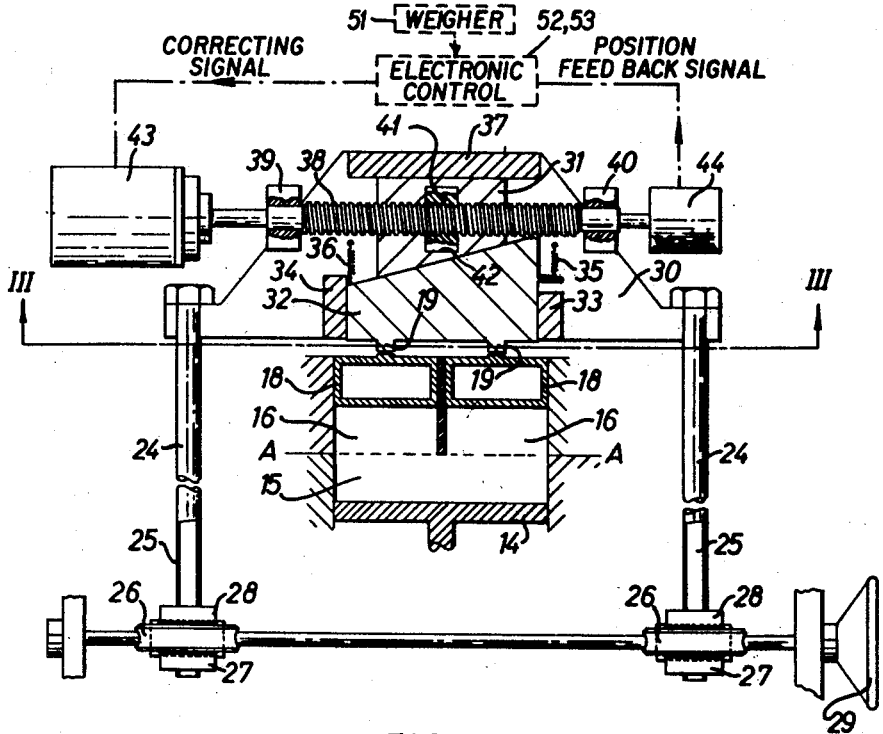
— FIG. 2. —
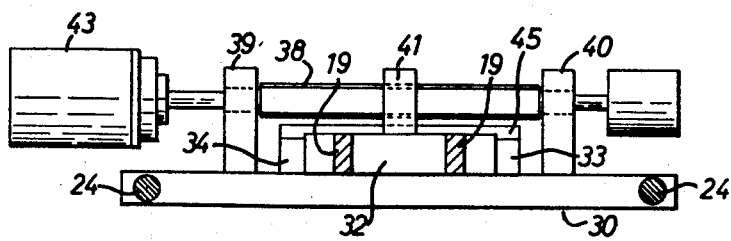
— FIG. 3. —
INVENTOR:
JOHN BARRETT BARTHOLOMEW
BY
ATTORNEYS United States Patent Office 3,179,069
Patented Apr. 20, 1965

3,179,069
DOUGH DIVIDERS
John Barrett Bartholomew, Cambridge, England,
assignor to Spillers Limited, London, England
Filed Dec. 20, 1961, Ser. No. 160,780
Claims priority, application Great Britain, Dec. 24, 1960,
44,375/60
11 Claims. (Cl. 107—15)

The present invention relates to dough dividers.

In the manufacture of bread it is necessary to divide a dough mass into portions so as to produce bread of a desired weight. As it has not been found practical to divide dough into pieces of known weight, dough dividing machines are constructed to provide portions, the volume of which can be varied to obtain the desired weight.

It is the object of this invention to provide an improvement in the means for varying the volume of the dough pieces produced by a divider of known type, so as to facilitate automatic control of the weight of the pieces by the operation of a servo mechanism responsive to a signal from an electronic weight sensing device.

Dough dividers are of several types and include either a rotary cylinder with a number of pockets or a series of boxes actuated in various ways. All types have a ram adapted to force dough into the pockets or boxes under pressure followed by means to shear off excess dough, empty the pockets or boxes and repeat the cycle. With all types the method of control is similar. Some of the dough pieces leaving are weighed and, if necessary, the volume of the pocket or box is altered until dough pieces of desired weight are delivered.

In a well known divider variation in the volume of the boxes is obtained by altering the position of stops which limit the travel of a movable wall of the box. The alteration in position is obtained by turning a hand wheel by means of a nut and threaded shaft which moves the stops nearer to or further from the moving wall of the dough box, so that the size of the pocket which is filled by the dough is varied.

It will be understood that as the dough is undergoing fermentation it is varying in density continuously and that many factors such as temperature, quality of yeast and flour can cause frequent need for correction. Accuracy of weight is very important, for not only are there legal requirements as to the sale of bread by weight, but the production of bread is very large and even small variations of a fraction of an ounce can, in the aggregate, cause serious commercial losses. It is, therefore, necessary for the operator to give constant attention to the divider but in spite of this serious errors occur on occasions and result in prosecution and loss of profit.

Several attempts have been made to provide means for weighing the dough pieces automatically and then applying a correction to the divider by means, for example, of a motor arranged to turn the hand wheel and so regulate the position of the stops, and hence the volume of the dough pieces.

However, the difficulties are considerable. It is necessary for the weight sensing device to ignore very small alterations and only to take action after a definite trend has been established which involves finding the average weight of a significant number of samples. It is also necessary to take account of those dough pieces which have already left the divider and are in transit to the weigher, but perhaps the greatest difficulty has been in employing a motor or servo device to actuate the existing hand wheel mechanism as there is invariably some lost motion, the power required is difficult to obtain with known types of electric servo motor and any connection to the hand wheel makes it unavailable for manual control, if needed. With a high rate of production the time of response must be very short and it is difficult to obtain the required control with any device operating through the usual type of stop adjusting mechanism.

According to one feature of the present invention a volume adjusting mechanism for limiting travel of a movable wall of a box in a dough divider includes a screw and nut operated wedge mechanism.

According to another feature of the present invention a volume adjusting mechanism for limiting the travel of the movable wall of a box of a dough divider is provided in which a member, acting as a stop to limit the travel of a movable wall in one direction, is mounted for movement in a given direction whilst in engagement with a wedge-shaped member which is movable in a direction transversely of said given direction by screw and nut mechanism.

According to a still further feature of the present invention a volume adjusting mechanism for limiting the travel of the movable wall of a box of a dough divider includes a pair of co-operating wedge members of which one abuts an abutment and is slidably mountd for movement in a direction transverse to the direction of travel of the movable wall, whilst the other is slidably mounted for movement in the direction of travel of the movable wall and acts as a stop to limit the travel of the wall in one direction, and a screw and nut mechanism for moving the first mentioned wedge member in said transverse direction.

Preferably two wedge shaped members are slidably mounted on a frame, for movement in directions substantially at right angles to one another, and the frame includes an abutment for engaging a face of the member driven by the screw and nut mechanism. The wedge members, screw and nut mechanism and frame form a unit which can be substituted for a conventional frame carrying the stops in an existing dough divider or which can be incorporated in a dough divider during manufacture.

In a conventional dough divider the position of the frame can be altered by turning a hand wheel associated with a nut and threaded shaft mechanism, so that when a unit is substituted for the conventional frame the screw and nut operated wedge mechanism represents a fine control superimposed on the existing control provided by the hand wheel; thus the hand wheel can still be operative for coarse adjustment or for use in an emergency. Whilst the screw and nut mechanism in the adjusting mechanism of the present invention can be operated manually, for example by a further hand wheel for rotating the screw, it is eminently suitable for power operation. Such power operation can be effective by a servo-motor which can be actuated from an electronic control. Such electronic control is preferably responsive to signals from a weight sensing mechanism.

I have found that by removing that part of the volume adjusting mechanism comprising the movable stops, and by substituting a wedge mechanism, it is possible to overcome all the difficulties encountered and to provide a simple device capable of automatic control.

The invention will be further described by way of example with reference to the accompanying drawings, in which:

FIG. 2 is a detail plan view, partly in section along the line II—II of FIG. 1, with certain parts removed for the sake of clarity, and FIG. 3 is a section along the line III—III of FIG. 2.

Figure 1:
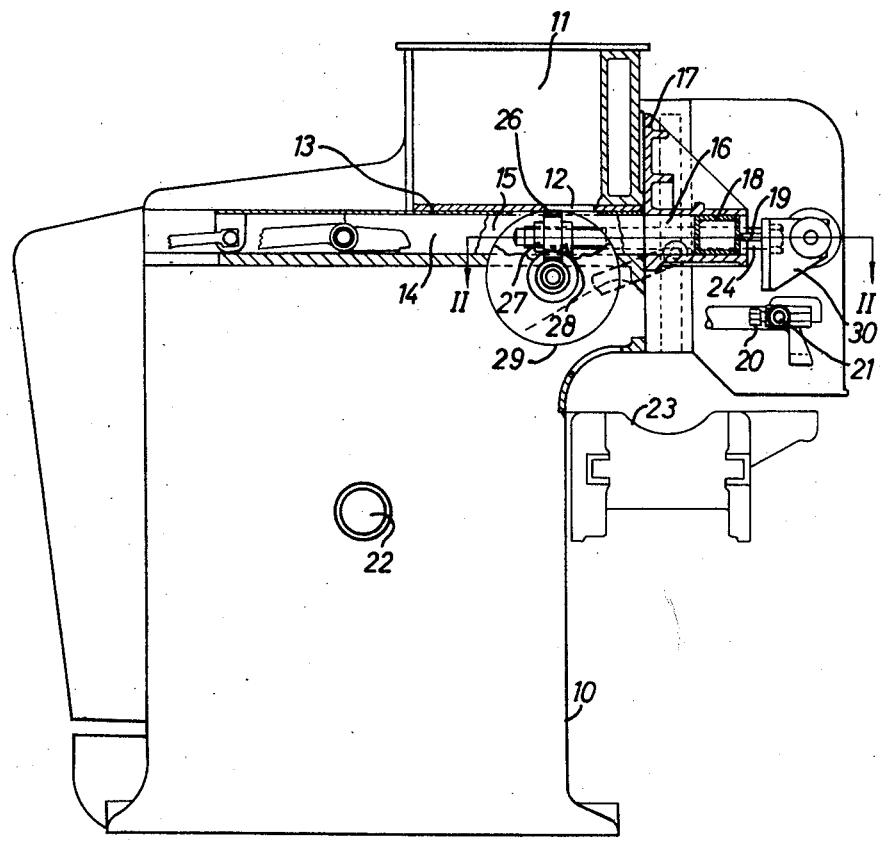
FIG. 1 is a diagrammatic side elevation, partly in section, of one type of dough divider, but embodying one embodiment of the present invention.

Referring to the drawings, one type of dough divider is shown in outline at 10 and includes a dough chamber 11 to receive a mass of dough for division, having at its bottom a feed opening 12 beneath which an upper knife 13 is reciprocable. A ram 14 is slidably disposed in pressure chamber 15 for pressing dough into one or more pockets 16 of a division box 17, each such pocket having a movable wall 18. The division box 17 is reciprocable in a vertical direction and when in its upper position outward movement of the movable wall 18 of each pocket is limited by a stop 19. When the division box is in its lower position, the movable wall 18 is engaged by a projection 20 on a draw bar 21 which is reciprocable in a horizontal direction to propel the movable wall inwardly. The upper knife 13, ram 14, the division box 17 and the draw bar 21 are reciprocated cyclically in timed relationship with one another by linkages operated by cams on a main shaft 22. When in operation, dough passes from the feed chamber 11 into the chamber 15 where a quantity of dough accumulates. When the ram moves to the right, as seen in FIG. 1, dough is forced into each of the pockets 16 of the division box 17, engaging the movable wall 18 of each box and the volume of dough forced into each pocket is determined by the position of the stop which limits the outward travel of the movable wall 18. The division box is then caused to descend and the dough in the pockets 16 is sheared off along the line A—A of FIG. 2. When the division box 17 is in its lower position the draw bar 21 is moved to the left, as seen in FIG. 1, a projection 20 engages each movable wall 18 and moves it to the left; and pieces of dough are discharged from the pockets 16 onto a conveyor 23 leading to a hander-up.

In a conventional dough divider of the kind illustrated, stops for limiting the outward travel of the movable walls 18 are customarily provided on a bar mounted on a pair of shafts 24; the inner ends of the shafts are screw-threaded as at 25 and carry nuts 26 disposed between bearings 27, 28 and rotatable by a hand wheel 29 through a worm and worm wheel connection.

The present invention provides a unit which can be substituted for such bar in an existing dough divider or which can be incorporated in a dough divider during manufacture. Such unit comprises a frame 30 upon which are slidably mounted a first wedge 31 and a second wedge 32. The second wedge 32 is restrained sideways by a pair of guides 33, 34 and against the frame 30 by a plate 45 connecting the guides 33, 34, and is urged by springs 35, 36 into close contact with the first wedge 31, the rear face of which engages an immovable guide or abutment 37. The movement of the first wedge 31 along the guide 37 is effected by a screw and nut mechanism comprising a screw-threaded rod 38, rotatably mounted in bearings 39, 40, and a nut member 41 fixed in a slot 42 in the first wedge member 31. By restraining any axial movement of the screw-threaded rod 38, and making the nut member 41 a close fit in the slot 42 and spring loading the second wedge 32 against the first wedge 31, and thereby the first wedge 31 against the guide 37, movement of the stops 19, which are carried by the second wedge 32, can be made very precise. Whilst the screw-threaded rod 38 can be rotated by hand for fine adjustment, it is eminently suitable for rotation by a servo-motor 43 carried by the frame 30 by means not shown. A rotary potentiometer 44 can be actuated by the screw-threaded rod 38. Though the threaded rod 38, nut 41, servo-motor 43 and the potentiometer 44 are above the plane of section indicated by the line II—II in FIG. 1, as will be more fully apparent from FIG. 3, for the purpose of illustration only they are included, partly in section, in FIG. 2.

The unit comprising the frame 30, the wedges 31, 32, and the screw and nut mechanism 38, 41, together with the servo-motor 43 and the potentiometer 44, can readily be mounted on the shafts 24 in place of the conventional bar customarily provided. The unit can accordingly be moved towards or away from the divider by the hand wheel 29 which can be utilized to provide a coarse adjustment; for manual operation in the event of failure of a servo system associated with the servo-motor 43. A further hand wheel for rotating the screw-threaded rod 38 may be provided for fine adjustment.

Figure 4:
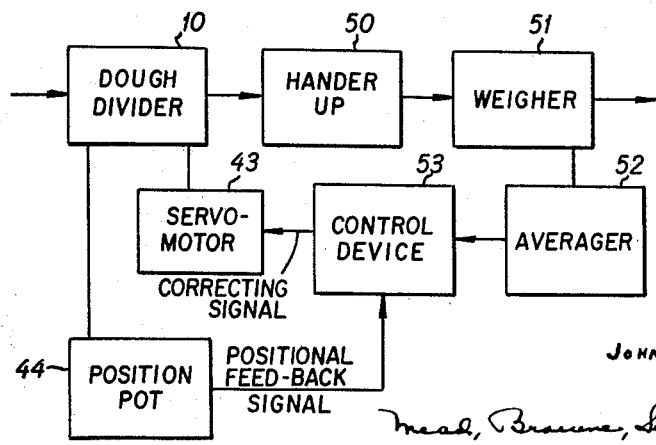
FIG. 4 is a schematic arrangement or view showing the relationship of the present dough divider in an automatic weight control system therefor.

If, after leaving the dough divider 10 (see FIG. 4) and the following hander-up 50, the dough portions are passed to weight sensitive means 51 and an electronic device 52, 53 responsive to signals therefrom can deliver a correcting signal derived from the average weight of a given number of pieces relative to a desired weight, any such correcting signal can be caused to effect operation of the servo-motor 43 to alter the volume of the following pieces of dough. A position feed back signal for the electronic device 52, 53 can be derived from the rotary potentiometer 44 actuated by the screw-threaded rod 38. Any signal provided by the potentiometer 44 will be related to the position of the nut 41 on the screw-threaded rod 38 and thus to the position of the stops 19 relatively to the frame 30.

I claim:

1. A volume adjusting mechanism for a dough divider having a division box provided with a movable wall, comprising a frame, means for slidably mounting a first wedge member on said frame for movement relative thereto in one direction, a second wedge member engageable with said first wedge member and slidable on said frame for movement relatively to said frame in a direction transverse to said one direction, an abutment on said frame for engagement with a face of said second wedge member, a screw and nut mechanism operatively connected between said frame and said second wedge member for slidably displacing said second wedge member relatively to said frame in said transverse direction, a servo-motor operatively connected to said screw and nut mechanism, means on said first wedge member constituting stops for limiting the travel of said movable wall in one direction and a second screw and nut mechanism for moving said frame in and opposed to said one direction.

2. A volume adjusting mechanism for a dough divider having a division box provided with a movable wall, a pair of selectively positionable adjustment shafts and first drive mechanism for axially displacing said adjustment shafts, comprising a frame, means for slidably mounting a first wedge member on said frame for movement relative thereto in one direction, a second wedge member engageable with said first wedge member and slidable along said frame for movement relatively to said frame in a direction transverse to said one direction, an abutment on said frame for engagement with a face of said second wedge member, a screw and nut mechanism operatively connected between said frame and said second wedge member for slidably displacing said second wedge member relatively to said frame in said transverse direction, means on said first wedge member constituting stops for limiting the travel of said movable wall in said one direction, and attachment means for mounting said frame on said shafts, said first drive mechanism and said screw and nut mechanism providing coarse and fine adjustment of the limit of travel of said movable wall in said one direction.

3. In a dough divider having means defining a pressure chamber, a division box, means defining at least two pockets in said division box, a movable wall to each pocket in said division box, a ram slidably disposed in said pressure chamber for pressing dough from said pressure chamber into said pockets of said division box, and adjustable stop mechanism for limiting the travel of said movable walls in a given direction, said stop mechanism comprising a pair of selectively positionable shafts, first drive mechanism for axially positioning said shafts, a frame carried by said shafts, a first wedge member on said frame, means for slidably guiding said first wedge member for movement relatively to said frame in said given direction, stop means on said first wedge member for limiting the travel of said wall members in said given direction, a second wedge member slidably mounted on said frame for movement relatively thereto in a direction substantially at right angles to said given direction, an abutment on said frame for engagement with one face of said second wedge member, means for urging a face of said first wedge member into abutment with another face of said second wedge member, and second drive mechanism for said second wedge member including a nut member operatively connected to said second wedge member and threadedly received on a screw member, and bearing means carried by said frame for supporting said screw member.

4. In a dough divider having means defining a pressure chamber, a division box, means defining at least two pockets in said division box, a movable wall to each pocket in said division box, a ram slidably disposed in said pressure chamber for pressing dough from said pressure chamber into said pockets of said division box, and adjustable stop mechanism for limiting the travel of said movable walls in a given direction, said stop mechanism comprising a pair of selectively positionable shafts, a frame carried by said shafts, a first wedge member on said frame, means for slidably guiding said first wedge member for movement relatively to said frame in said given direction, stop means on said first wedge member for limiting the travel of said wall members in said given direction, a second wedge member slidably mounted on said frame for movement relatively thereto in a direction substantially at right angles to said given direction, an abutment on said frame for engagement with one face of said second wedge member, means for urging a face of said first wedge member into abutment with another face of said second wedge member, and drive mechanism for said second wedge member including a nut member operatively connected to said second wedge member and threadedly received on a screw member, bearing means carried by said frame for supporting said screw member, and a servo-motor operatively connected to said screw member.

5. In a dough divider having means defining a pressure chamber, a division box, means defining at least two pockets in said division box, a movable wall to each pocket in said division box, a ram slidably disposed in said pressure chamber for pressing dough from said pressure chamber into said pockets of said division box, and adjustable stop mechanism for limiting the travel of said movable walls in a given direction, said stop mechanism comprising a pair of selectively positionable shafts, a frame carried by said shafts, a first wedge member on said frame, means for slidably guiding said first wedge member for movement relatively to said frame in said given direction, stop means on said first wedge member for limiting the travel of said wall members in said given direction, a second wedge member slidably mounted on said frame for movement relatively thereto in a direction substantially at right angles to said given direction, an abutment on said frame for engagement with one face of said second wedge member, means for urging said first wedge member into abutment with another face of said second wedge member, and drive mechanism for said second wedge member including a nut member operatively connected to said second wedge member and threadedly received on a screw member, bearing means carried by said frame for supporting said screw member, a servo-motor operatively connected to said screw member, and a potentiometer operatively connected to said screw member for providing a signal indicative of the axial position of the nut member on the screw member.

6. In a dough divider having means defining a pressure chamber, a division box, means defining at least two pockets in said division box, a movable wall to each pocket in said division box, a ram slidably disposed in said pressure chamber for pressing dough from said pressure chamber into said pockets of said division box, and adjustable stop mechanism for limiting the travel of said movable walls in a given direction, said stop mechanism comprising a pair of shafts, manually operative screw and nut mechanisms for selectively positioning said shafts in an axial direction, a frame carried by said shafts, a first wedge member on said frame, means for slidably guiding said first wedge member for movement relatively to said frame in said given direction, stop means on said first wedge member for limiting the travel of said wall members in said given direction, a second wedge member slidably mounted on said frame for movement relatively thereto in a direction substantially at right angles to said given direction, an abutment on said frame for engagement with one face of said second wedge member, means for urging said first wedge member into abutment with another face of said second wedge member, and drive mechanism for said second wedge member including a nut member operatively connected to said second wedge member and threadedly received on a screw member, and bearing means carried by said frame for supporting said screw member.

7. In a dough divider having means defining a pressure chamber, a division box, means defining at least two pockets in said division box, a movable wall to each pocket in said division box, a ram slidably disposed in said pressure chamber for pressing dough from said pressure chamber into said pockets of said division box, and adjustable stop mechanism for limiting the travel of said movable walls in a given direction, said stop mechanism comprising a pair of shafts, manually operable screw and nut mechanisms for selectively positioning said shafts in an axial direction, a frame carried by said shafts, a first wedge member on said frame, means for slidably guiding said first wedge member for movement relatively to said frame in said given direction, stop means on said first wedge member for limiting the travel of said wall members in said given direction, a second wedge member slidably mounted on said frame for movement relatively thereto in a direction substantially at right angles to said given direction, an abutment on said frame for engagement with one face of said second wedge member, means for urging said first wedge member into abutment with another face of said second wedge member, and drive mechanism for said second wedge member including a nut member operatively connected to said second wedge member and threadedly received on a screw member, bearing means carried by said frame for supporting said screw member, and a potentiometer operatively connected to said screw member for providing a signal indicative of the axial position of the nut member on the screw member.

8. A dough divider embodying a division box, movable into a feed position in registration with said pressure chamber and into a discharge position, a pressure chamber, a dough receiving hopper, a ram reciprocable in said pressure chamber for feeding dough into said division box when in said feed portion, means for discharging dough from said division box when in said discharge position, a movable wall in said division box, drive means for reciprocating said ram and for moving said division box and for reciprocating said discharge means in timed relationship with one another, and volume adjusting means for limiting the travel of said movable wall in a given direction when said box is in said feed position, said adjusting means comprising a pair of selectively positionable shafts, manually operative screw and nut mechanism for positioning said shafts in an axial direction substantially parallel to said given direction, a frame carried by said shafts, a first wedge shaped member, means on said frame for slidably guiding said first wedge shaped member for movement relatively to said frame substantially in said given direction, stop means on said first wedge shaped member for limiting the travel of said movable wall in said given direction, a second wedge shaped member, means on said frame for slidably guiding said second wedge shaped member for movement relatively to said frame in a direction transversely of said given direction, means for urging said first wedge shaped member into engagement with said second wedge shaped member, a screw threaded member, bearing means on said frame for journalling said screw threaded member, a nut member on said screw member operatively connected to said second wedge shaped member for displacing it relatively to said frame in said transverse direction, and drive means for selectively rotating said screw threaded member.

9. In a dough divider having a division box, a movable wall in said division box, volume adjusting mechanism for limiting the travel of said movable wall in a given direction comprising a frame, a pair of mutually engageable co-operating wedge-shaped members slidably mounted on said frame for movement in directions substantially at right angles to one another, an abutment on said frame for engaging a face of one of said wedge-shaped members, stop means on the other of said wedge-shaped members for limiting the travel of said wall in said given direction, manually operable drive means for moving said frame in and opposed to said given direction for effecting coarse adjustment of said stop means, screw and nut mechanism for moving said one wedge-shaped member along said frame whilst in engagement with said abutment, and drive means for operating said screw and nut mechanism for effecting fine adjustment of said stop means.

10. A volume adjusting mechanism for a dough divider having a division box provided with a movable wall, comprising a frame, means for slidably mounting a first wedge member on said frame for movement relative thereto in one direction, means on said first wedge member constituting stops for limiting the travel of said movable wall in one direction, a second wedge member engageable with said first wedge member slidably mounted on said frame for movement relatively to said frame in a direction transversely to said given direction, an abutment on said frame for engagement with a face of said second wedge member, a screw and nut mechanism operatively connected between said frame and said second wedge member for slidably displacing said second wedge member relatively to said frame in said transverse direction, first drive means for moving said frame in said one direction and in a direction opposite to said one direction, and second drive means for operating said screw and nut mechanism.

11. A volume adjusting mechanism for a dough divider having a division box provided with a movable wall, comprising a frame, means for slidably mounting a first wedge member on said frame for movement relative thereto in one direction, means on said first wedge member constituting stops for limiting the travel of said movable wall in said one direction, a first screw and nut mechanism operatively connected between said frame and said dough divider for moving said frame in said one direction and in a direction opposite to said one direction, first drive means for said first screw and nut mechanism, a second wedge member slidably mounted on said frame for movement relatively to said frame in a direction transverse to said one direction, an abutment on said frame for engagement with a face of said second wedge member, a second screw and nut mechanism operatively connected between said frame and said second wedge member for slidably displacing said second wedge member relatively to said frame in said transverse direction, and second drive means for said second screw and nut mechanism.

References Cited by the Examiner
UNITED STATES PATENTS
2,007,686    7/35    Marasso _____ 107—15

ROBERT E. PULFREY, *Primary Examiner.*
JOSEPH D. SEERS, CHARLES A. WILLMUTH,
*Examiners.*